(12) United States Patent
Dhruna et al.

(10) Patent No.: US 11,541,826 B2
(45) Date of Patent: Jan. 3, 2023

(54) BRACKET FOR A PILLAR ASSEMBLY

(71) Applicant: Ford Global Technologies, LLC, Dearborn, MI (US)

(72) Inventors: Beatriz Arredondo Dhruna, Canton, MI (US); Alexandra Margaret Rose, Windsor (CA); Amit Chakravarty, Warren, MI (US); Luis Alberto Durán Hernández, Coyoacan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 328 days.

(21) Appl. No.: 17/085,241

(22) Filed: Oct. 30, 2020

(65) Prior Publication Data

US 2022/0134963 A1     May 5, 2022

(51) Int. Cl.
*B60R 11/02* (2006.01)
*B60R 13/02* (2006.01)
*B60R 11/00* (2006.01)

(52) U.S. Cl.
CPC ........ *B60R 11/0229* (2013.01); *B60R 13/025* (2013.01); *B60R 2011/0022* (2013.01); *B60R 2011/0059* (2013.01); *B60R 2300/40* (2013.01)

(58) Field of Classification Search
CPC ............... B60R 11/0229; B60R 13/025; B60R 2011/0022; B60R 2011/0059; B60R 2300/40
USPC ........................................................ 348/837
See application file for complete search history.

(56) References Cited

U.S. PATENT DOCUMENTS

| 10,046,703 | B2 | 8/2018 | Hoyda et al. | |
| 10,604,073 | B2 | 3/2020 | Cho | |
| 2008/0197610 | A1* | 8/2008 | Downey | B60R 21/213 |
| | | | | 280/730.2 |
| 2016/0345045 | A1* | 11/2016 | Liu | B60R 11/0235 |
| 2019/0041222 | A1* | 2/2019 | Grewal | B60K 37/06 |

FOREIGN PATENT DOCUMENTS

| CN | 108973861 A | 12/2018 |
| CN | 109760748 A | 5/2019 |
| CN | 10758565 A | 2/2020 |
| CN | 110789452 A | 2/2020 |

* cited by examiner

*Primary Examiner* — Allen C Wong
(74) *Attorney, Agent, or Firm* — Vichit Chea; Price Heneveld LLP

(57) ABSTRACT

A bracket for a display assembly includes a body that has a first edge and a second edge that define a first surface and a second surface of the body. An elongated retention feature is coupled to the first edge of the body and defines an elongated slot proximate to the first surface of the body. A plurality of retention clips are coupled to the second edge of the body. Each of the plurality of retention clips define a slot proximate to the first surface of the body. At least one housing is coupled to the second surface of the body and defines locking apertures. At least one cap is selectively coupled to the at least one housing. The at least one cap defines locking features selectively disposed within the locking apertures that are defined by the at least one housing.

20 Claims, 14 Drawing Sheets

BRACKET FOR A PILLAR ASSEMBLY

FIELD OF THE DISCLOSURE

The present disclosure generally relates to a pillar assembly for a vehicle. More specifically, the present disclosure generally relates to a bracket for a display assembly of the pillar assembly.

BACKGROUND OF THE DISCLOSURE

Vehicles typically include structural pillars, such as A-pillars, that frame a windshield and provide structural support for the vehicle.

SUMMARY OF THE DISCLOSURE

According to a first aspect of the present disclosure, a pillar assembly for a vehicle includes a pillar frame. A trim panel is disposed on and coupled to the pillar frame. The trim panel defines an aperture. A display assembly is disposed within the aperture and operably coupled to the pillar frame. The display assembly includes a bracket that is coupled to the pillar frame and has a first edge that defines an elongated slot and a second edge that includes retention clips. The retention clips each define a slot. A display screen is operably coupled to the bracket and is disposed within the aperture of the trim panel. An assembly circuit board is operably coupled to the bracket and is communicatively coupled to the display screen. The assembly circuit board includes a controller and a cap that defines locking features and is selectively coupled to the bracket.

Embodiments of the first aspect of the disclosure can include any one or a combination of the following features:
- the display screen has a first side and a second side;
- the first side is disposed within the elongated slot and the second side is disposed within the slots defined by each of the retention clips;
- the bracket further includes a housing that includes a plurality of walls;
- the plurality of walls defines a first peripheral wall and a second peripheral wall that each define locking apertures;
- the locking features of the cap are operably coupled to the housing of the bracket via the locking apertures;
- the bracket further includes an attachment feature;
- the bracket is coupled to the pillar frame via the attachment feature;
- the display assembly includes a display circuit board that is communicatively coupled to the assembly circuit board and the display screen;
- the display screen is configured to display an image of an area exterior to said vehicle; and/or
- the display circuit board is operably coupled to the display screen and at least partially extends between the retention clips of the bracket.

According to a second aspect of the present disclosure, a display assembly for a vehicle pillar includes a bracket that has a first edge that defines an elongated slot and a second edge that includes retention clips. The bracket includes a first housing and a second housing. An assembly circuit board is disposed within the first housing. The assembly circuit board includes a controller. A display screen is operably coupled to the bracket. A display circuit board is electrically coupled to the display screen and is communicatively coupled with the assembly circuit board. The display circuit board is disposed within the second housing. At least one cap is selectively coupled to one of the first housing and the second housing. The at least one cap includes locking features.

Embodiments of the second aspect of the disclosure can include any one or a combination of the following features:
- the bracket includes an elongated retention feature that defines the elongated slot;
- the display screen has a first side and a second side;
- the first side is operably coupled to the elongated retention feature and the second side is operably coupled to each of the retention clips;
- the first housing and the second housing each include peripheral walls that define locking apertures;
- the at least one cap includes a first cap and a second cap;
- locking features of the first cap are disposed within the locking apertures of the first housing and the locking features of the second cap are disposed within the locking apertures of the second housing;
- an attachment feature is coupled to the bracket;
- the attachment feature is configured to couple the bracket to said vehicle pillar;
- the display circuit board includes electrical connectors outwardly extending from the display circuit board; and/or
- the electrical connectors extend between each of the retention clips of the bracket.

According to a third aspect of the present disclosure, a bracket for a display assembly includes a body that has a first edge and a second edge that define a first surface and a second surface of the body. An elongated retention feature is coupled to the first edge of the body and defines an elongated slot proximate to the first surface of the body. A plurality of retention clips are coupled to the second edge of the body. Each of the plurality of retention clips define a slot proximate to the first surface of the body. At least one housing is coupled to the second surface of the body and defines locking apertures. At least one cap is selectively coupled to the at least one housing. The at least one cap defines locking features selectively disposed within the locking apertures that are defined by the at least one housing.

Embodiments of the third aspect of the disclosure can include any one or a combination of the following features:
- the at least one housing includes a first housing and a second housing;
- the at least one cap includes a first cap that is operably coupled to the first housing and a second cap is operably coupled to the second housing;
- the second housing includes a first tab and a second tab that at least partially define the second housing;
- the locking apertures of the second housing are defined by the first and second tabs and peripheral walls of the second housing;
- the elongated retention feature and the plurality of retention clips are configured to retain an arcuate display screen of said display assembly;
- an attachment feature is coupled to the second surface of the body; and/or
- an assembly circuit board is disposed within the at least one housing.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
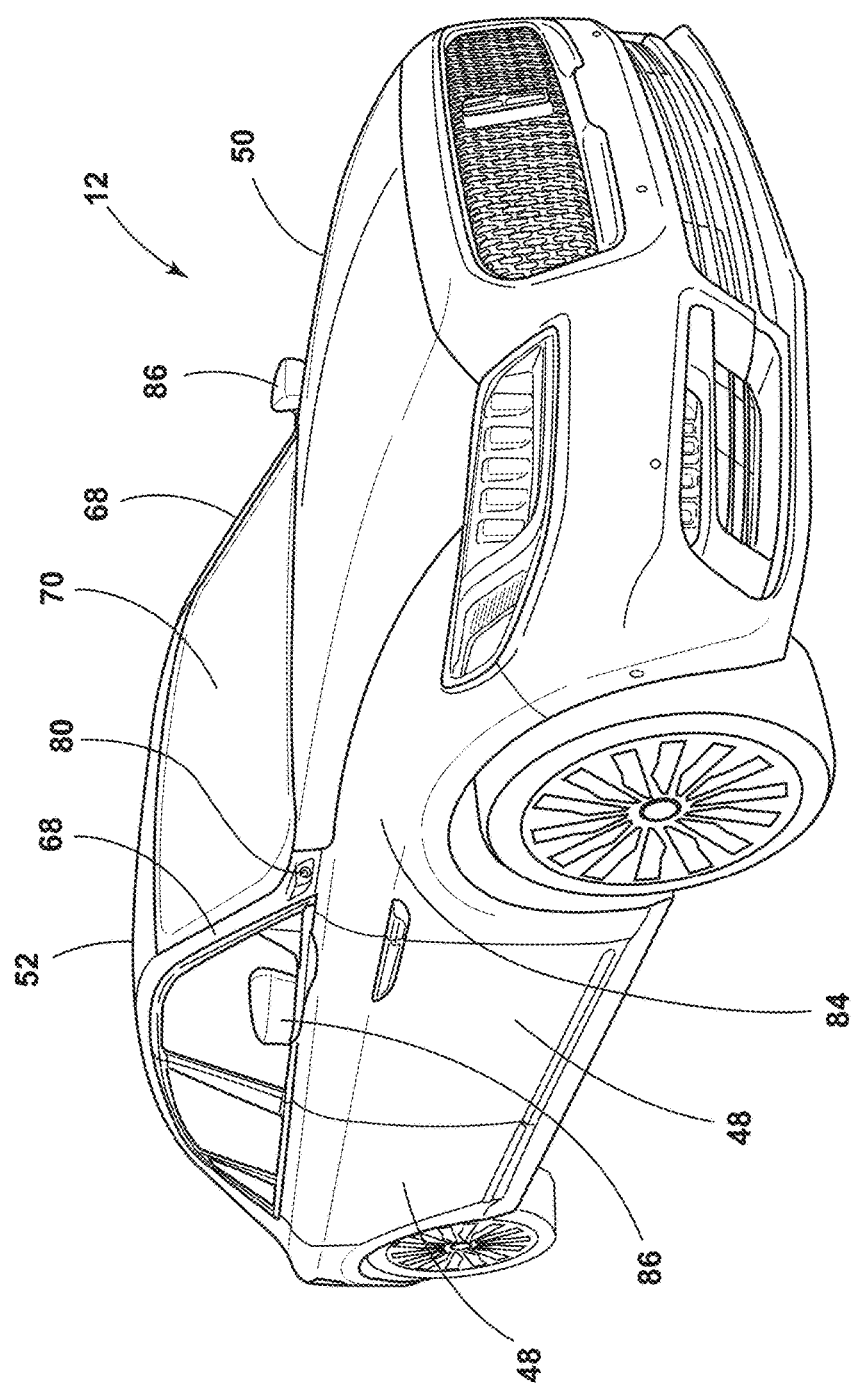
FIG. 1 is a front perspective view of a vehicle of the present disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-14, reference number 10 generally refers to a pillar assembly for a vehicle 12 including a pillar frame 14 and a trim panel 16. The trim panel 16 is disposed on and coupled to the pillar frame 14, and the trim panel 16 defines an aperture 18. A display assembly 20 is disposed within the aperture and operably coupled to the pillar frame 14 and includes a bracket 22 coupled to the pillar frame 14. The bracket 22 has a first edge 24 that defines an elongated slot 26 and a second edge 28 that includes retention clips 30. The retention clips 30 each define a slot 32. A display screen 34 is operably coupled to the bracket 22 and is disposed within the aperture 18 of the trim panel 16. An assembly circuit board 36 is operably coupled to the bracket 22 and communicatively coupled to the display screen 34. The assembly circuit board 36 includes a controller 38. A cap 40 defines locking apertures 152 and is selectively coupled to the bracket 22.

Figure 2:
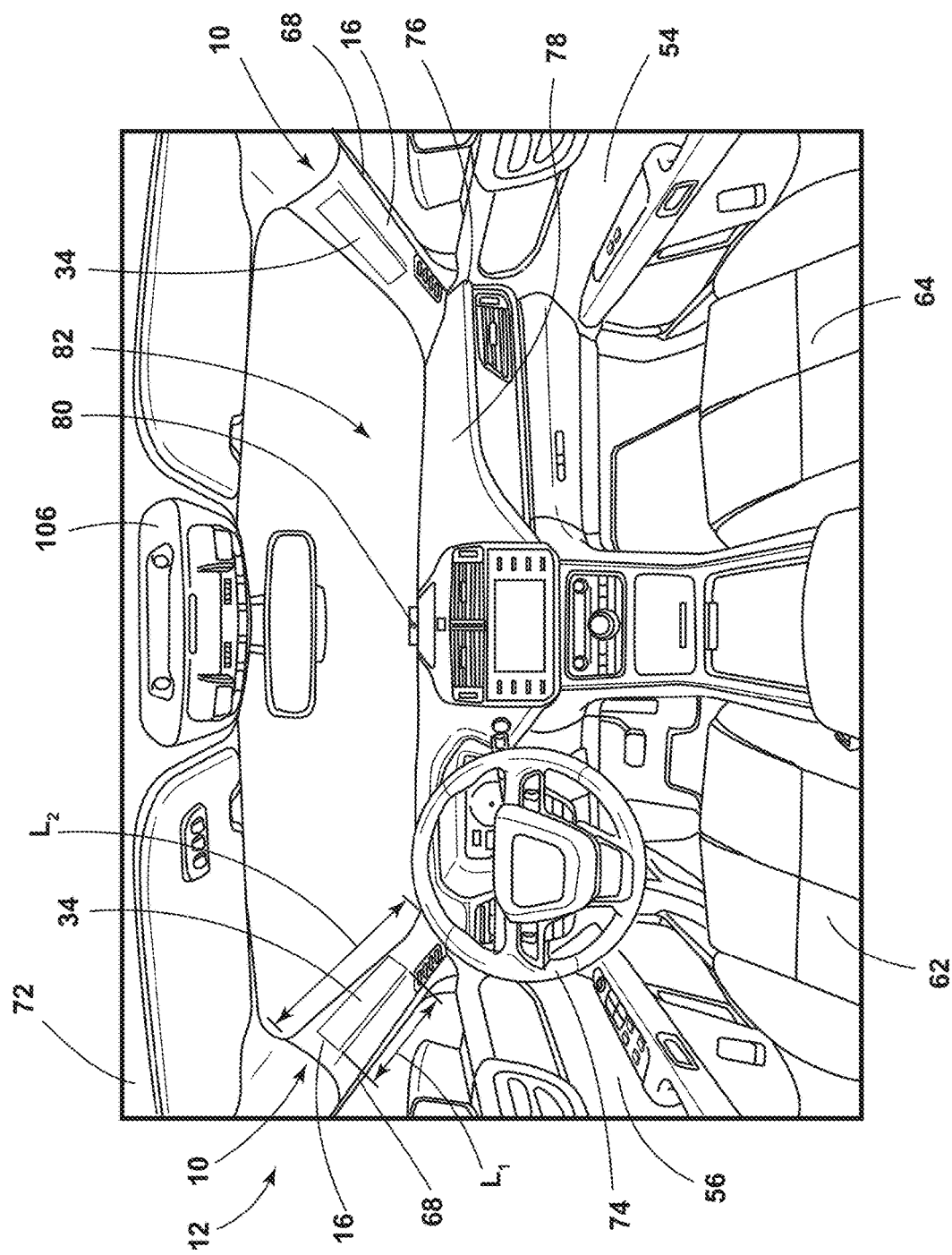
FIG. 2 is an enlarged partial side perspective view of an interior of a vehicle of the present disclosure.
Figure 3:
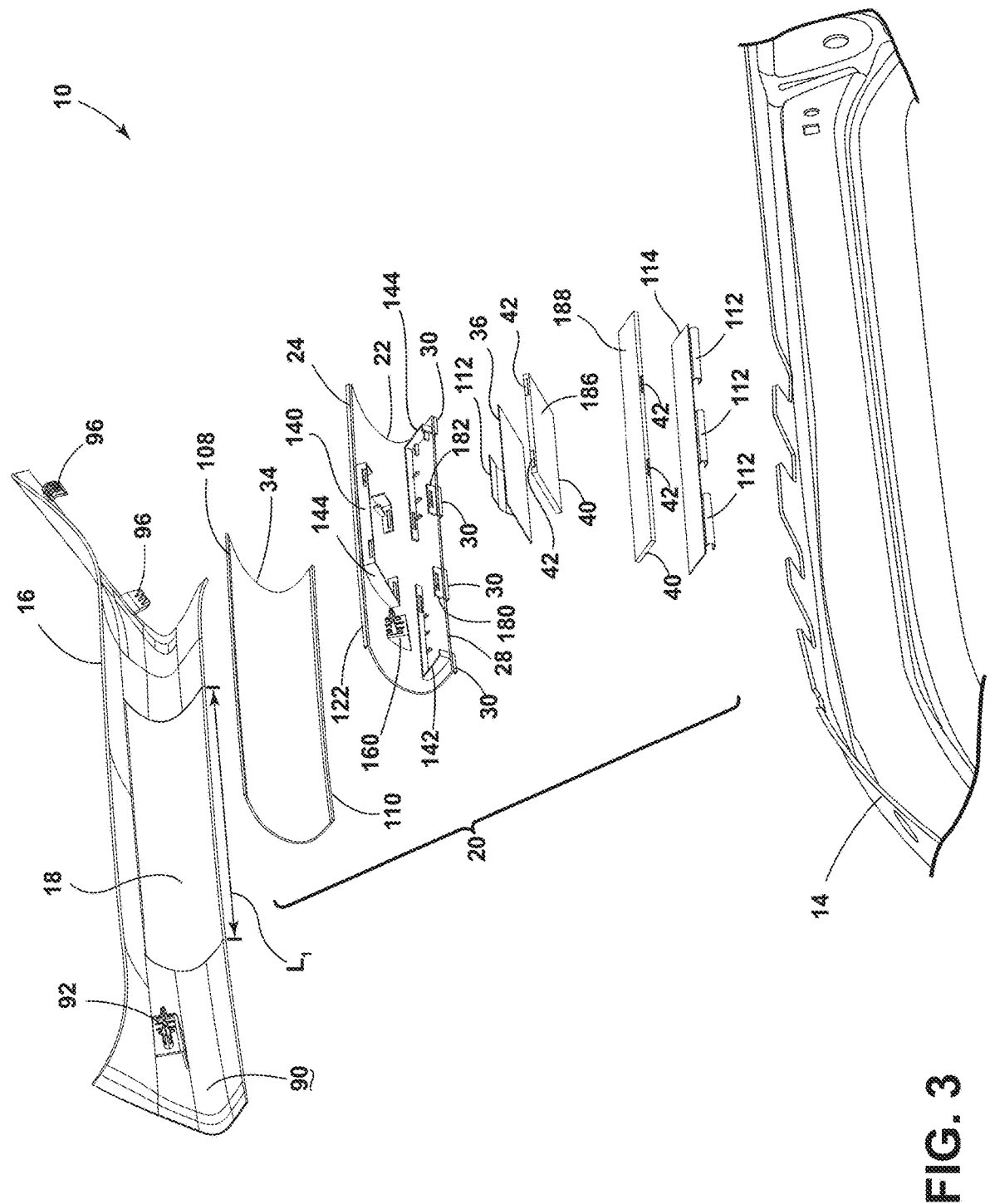
FIG. 3 is an exploded side perspective view of a pillar assembly of the present disclosure.
Figure 4:
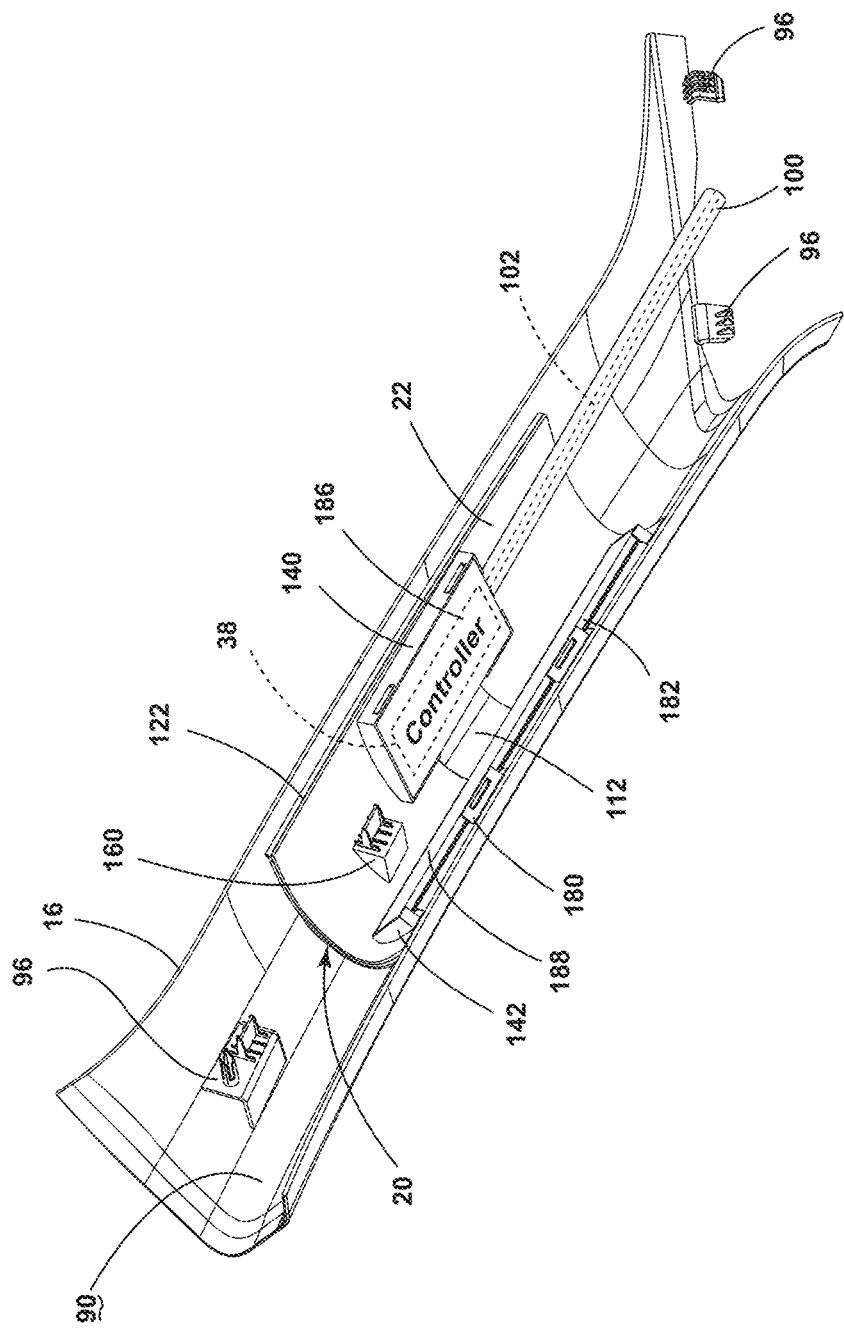
FIG. 4 is a rear side perspective view of a pillar assembly of the present disclosure with a trim panel and a display assembly.
Figure 5:
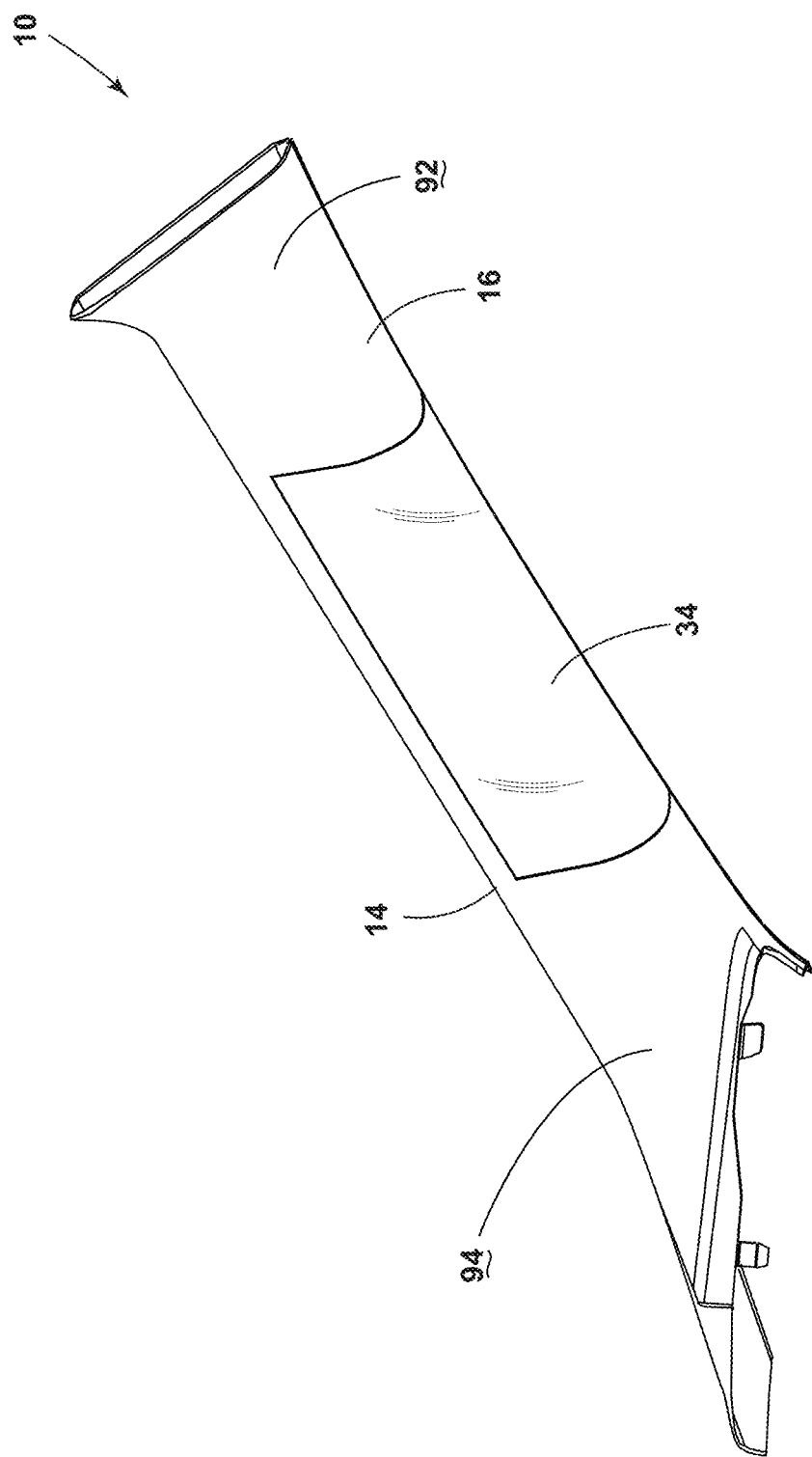
FIG. 5 is a front perspective view of a trim panel and a display screen of the present disclosure.
Figure 6:
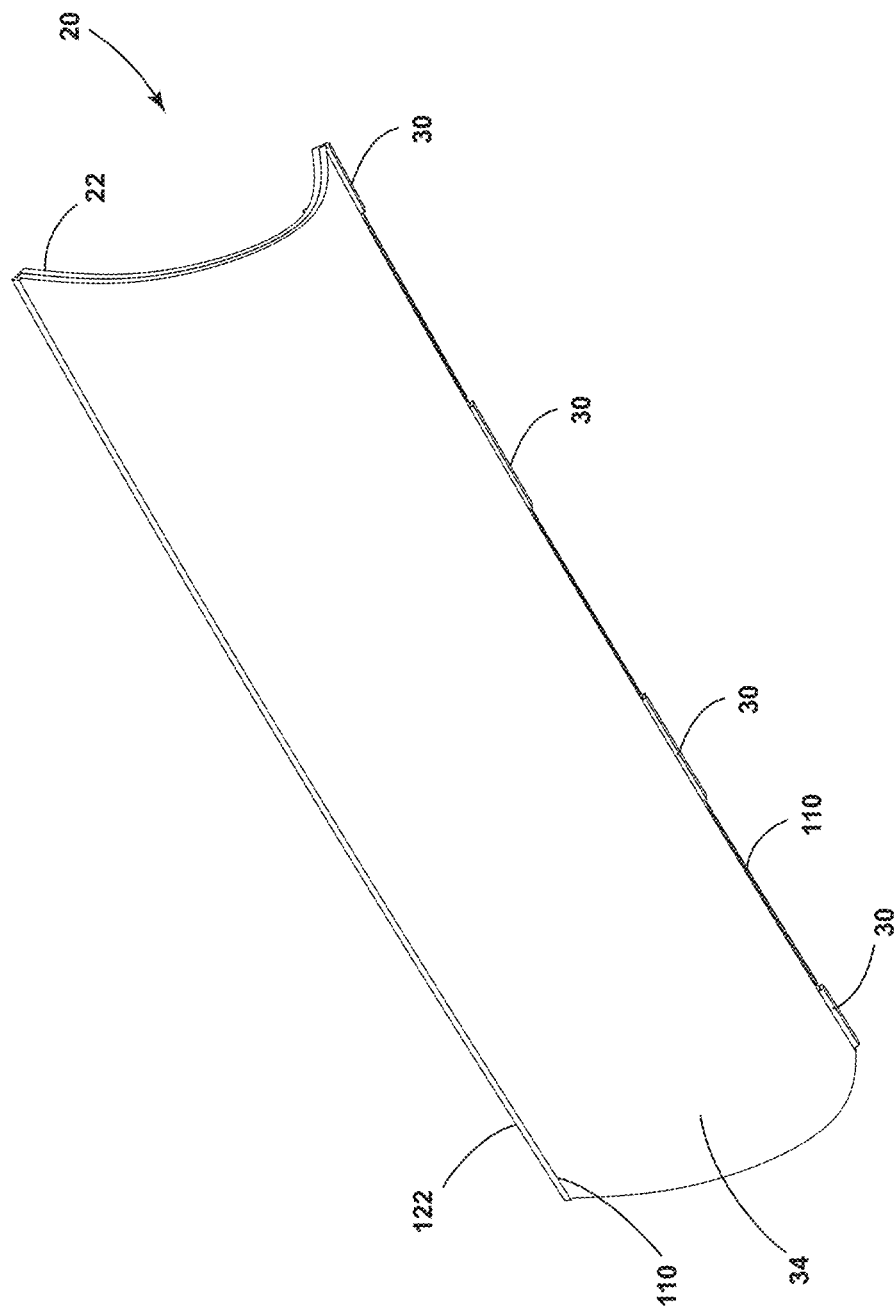
FIG. 6 is a front perspective view of a display assembly of the present disclosure.

Referring now to FIGS. 1-3, the vehicle 12 includes doors 48, a vehicle body 50, and a roof 52 that defines an interior 54 of the vehicle 12 having a passenger compartment 56 therein. The passenger compartment 56 includes a first seating row 58 and more seating rows may be included in the vehicle 12, without departing from the teachings herein. The first seating row 58 may include a driver seat 62 and a passenger seat 64. In various examples, the vehicle 12 is a wheeled motor vehicle 12, which may be a sedan, a sport utility vehicle, a truck, a van, a crossover, and/or other styles of vehicle. The vehicle 12 may be a manually operated vehicle (e.g., with a human driver), a fully autonomous vehicle (e.g., no human driver), or a partially autonomous vehicle (e.g., may be operated with or without a human driver). Additionally, the vehicle 12 may be utilized for personal and/or commercial purposes, such as ride-providing services (e.g., chauffeuring) and/or ride-sharing services.

The vehicle body 50 includes vehicle pillars, which include A-pillars 68 that frame a windshield 70 of the vehicle 12 and to which a headliner 72 and the above-mentioned trim panel 16 may be operably coupled. The A-pillars 68 are positioned proximate to each of the driver seat 62 and the passenger seat 64 and provide structural support for the vehicle 12. As illustrated in FIG. 2, the A-pillars 68 are positioned generally proximate to a steering wheel 74 and a passenger-side 76 of a vehicle dashboard 78. Stated differently, the A-pillars 68 generally extend between the roof 52 and the dashboard 78 of the vehicle 12 proximate to the doors 48 of the vehicle 12. The A-pillars 68 each include the pillar assembly 10 mentioned above, such that each A-pillar 68 includes the pillar frame 14 and the trim panel 16 disposed on and coupled to the pillar frame 14.

With further reference to FIGS. 1-3, the vehicle 12 may also include a camera 80 or other vision-based device coupled to the vehicle dashboard 78 and configured to detect an area exterior 82 to the vehicle 12. Additionally or alternatively, the camera 80 may be coupled to an exterior portion 84 of the vehicle 12, such as a side mirror 86 or on the vehicle body 50 proximate to each of the A-pillars 68. The vehicle 12 may include a single camera 80 or a plurality of cameras disposed on the vehicle body 50 and/or the vehicle dashboard 78. The camera 80 is communicatively coupled to the assembly circuit board 36, described below. Stated differently, the display screen 34 is configured to display the area exterior 82 to the vehicle 12 that may otherwise be obscured from the driver's view by the A-pillars 68. The configuration of the camera 80 and the display screen 34 is described further below.

With reference to FIGS. 2-5, the trim panel 16 may be formed from a rigid material that includes an inner surface 90 and an outer surface 92, such that the outer surface 92 may include a fabric covering 94. The outer surface 92 may provide the trim panel 16 within aesthetic appearance based on the various colors and materials that may be used for the fabric covering 94. Additionally or alternatively, the outer surface 92 of the trim panel 16 may be formed from a polymeric material or other generally rigid material. The trim panel 16 defines the aperture 18 mentioned above extending along a length $L_1$ of the trim panel 16.

The aperture 18 is generally defined to have a similar dimension to the display screen 34, mentioned above. It is also contemplated that the aperture 18 may be slightly smaller than the display assembly 20, such that the first edge 24 and the second edge 28 may be concealed by the trim panel 16. The display assembly 20 may appear to be integrally formed with the trim panel 16, such that the outer surface 92 and the display screen 34 may form a continuous surface of the A-pillar 68, described further below. The trim panel 16 is coupled to the pillar frame 14 via fasteners 96 operably coupled to the inner surface 90 of the trim panel 16.

With further reference to FIGS. 2-5, the display assembly 20 is operably coupled to the pillar frame 14 and is disposed within the aperture 18 defined by the trim panel 16. It is generally contemplated that the display assembly 20 is disposed within the aperture 18 of the trim panel 16, such that the display assembly 20 may appear to be integrally formed with the trim panel 16. Stated differently, the aperture 18 defined by the trim panel 16 may be sized to accommodate the display screen 34 of the display assembly 20. The trim panel 16 generally covers the display assembly 20, as well as insulated tubes 100 and/or other hoses that may be disposed within the pillar assembly 10 behind the display assembly 20. The insulated tube 100 may house electrical wiring 102 that is operably coupled to the assembly circuit board 36 and provides electrical power for the display assembly 20. The trim panel 16 may also cover secondary insulated tubes that may house additional electrical wiring 102, which may be used for the operation of an overhead console 106 coupled to the headliner 72 or other interior electrical components within the interior 54 of the vehicle 12.

Referring now to FIGS. 3-6 and as mentioned above, the display assembly 20 includes the display screen 34 coupled to the bracket 22. The display screen 34 may be arcuate or generally curved to follow the curvature of the trim panel 16. Stated differently, the display assembly 20 is configured to follow the curvature of the A-pillar 68 (FIG. 2). Additionally or alternatively, the display screen 34 may be rectangular, planar, triangular, circular, oblong, or any other shape generally known in the art that may seamlessly couple to the trim panel 16. The display screen 34 includes a first side 108 and a second side 110 at which the display screen 34 is coupled to the bracket 22, described below. It is generally contemplated that the second side 110 of the display screen 34 includes a plurality of electrical connectors 112 coupled to a display circuit board 114. The electrical connectors 112 may be lead lines that electrically couple the assembly circuit board 36 with the display screen 34.

The display screen 34 may be formed from organic light-emitting diodes (OLED), also known as an organic electroluminescent diode. OLED is a light-emitting diode in which the emissive electroluminescent layer is formed from a film of an organic compound that emits light in response to an electric current. OLED portions of the display screen 34 may be operated using a passive-matrix or an active matrix. For example, the passive-matrix may include rows that are controlled sequentially as opposed to the active matrix, which operates each individual pixel of the display screen 34 in an on or off direction. It is generally contemplated that the active-matrix may result in a higher display resolution for the display screen 34 and may be utilized for larger displays that may extend along a greater length $L_2$ of the A-pillar 68 (FIG. 2). The display screen 34 described herein may utilize either the passive-matrix or the active-matrix depending on the construction and configuration of the vehicle 12 (FIG. 1).

With further reference to FIGS. 3-6, the display circuit board 114 includes a microcontroller 116 that operates the display screen 34. The microcontroller 116 of the display circuit board 114 is communicatively coupled to the controller 38 of the assembly circuit board 36, such that the microcontroller 116 may execute data information received from the assembly circuit board 36. It is generally contemplated that the controller 38 and the microcontroller 116 each may include a processor and other circuitry configured to execute the routines and operations set forth by the controller 38 and the microcontroller 116, respectively. Further, the controller 38 and the microcontroller 116 may each be configured as a "Raspberry Pi®" or other configurations of single-board computers to fit within the display assembly 20 between the trim panel 16 and the pillar frame 14. The operations of the assembly circuit board 36 and the display circuit board 114 will be described further below in relation to FIGS. 12-14.

Figure 7:
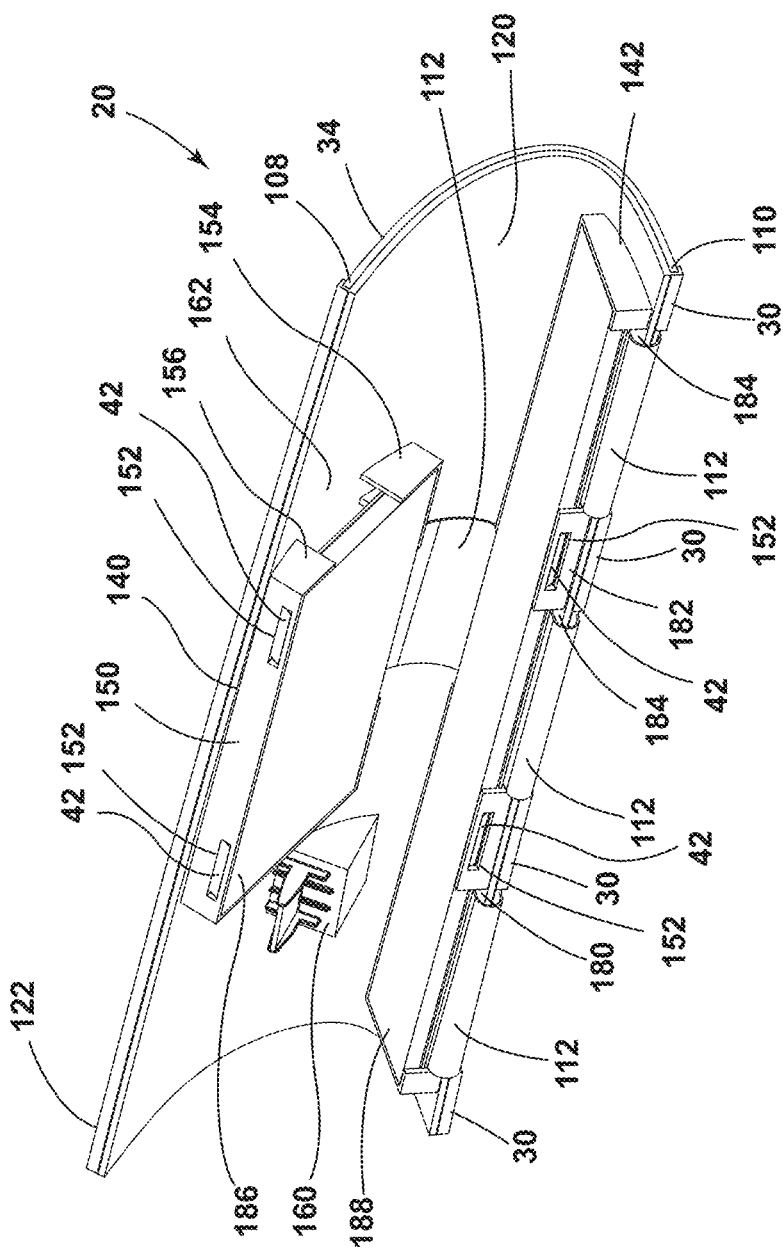
FIG. 7 is a rear perspective view of the display assembly of FIG. 6.
Figure 8:
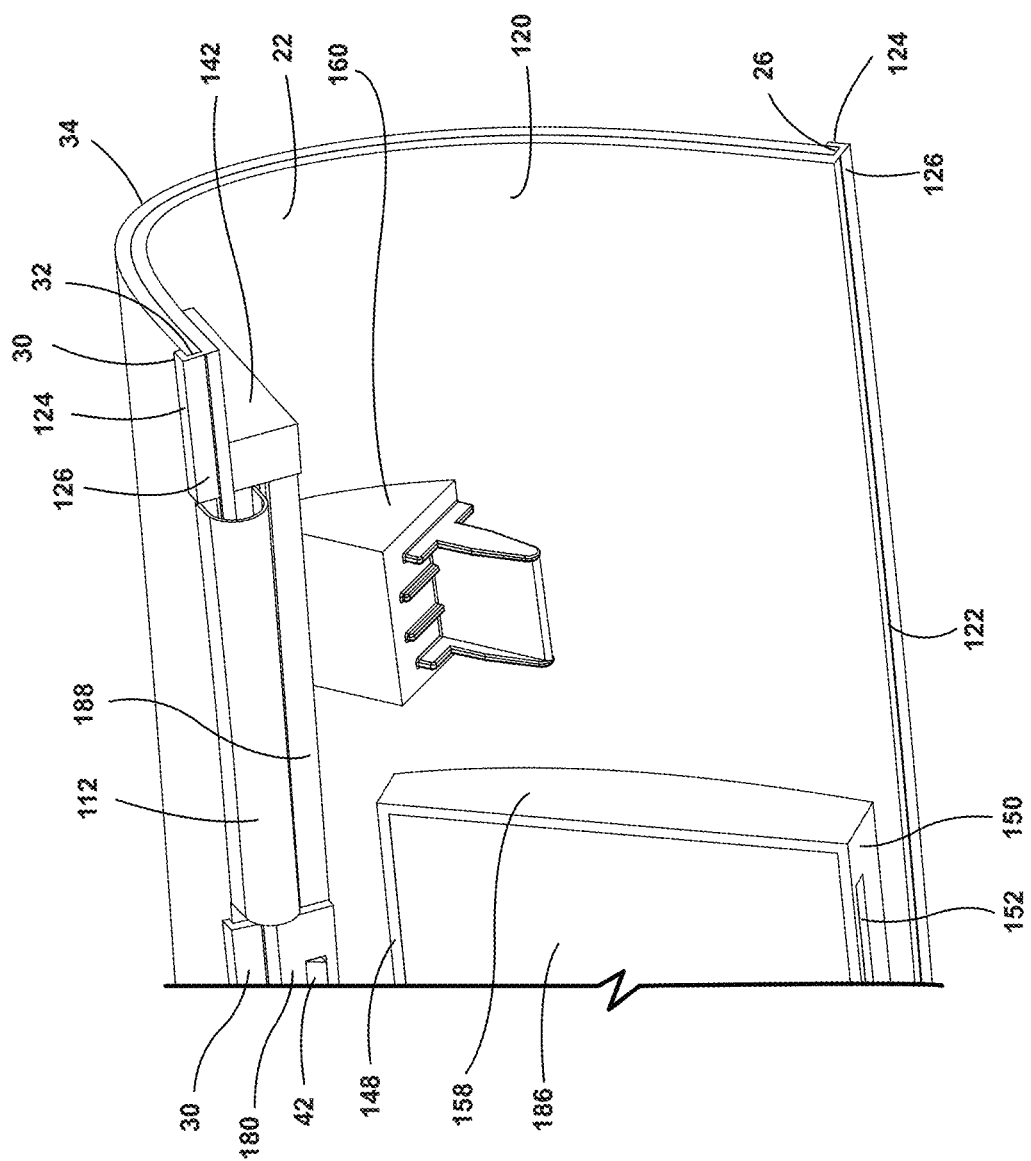
FIG. 8 is an enlarged partial side perspective view of the display assembly of FIG. 7 taken at area VIII.
Figure 9:
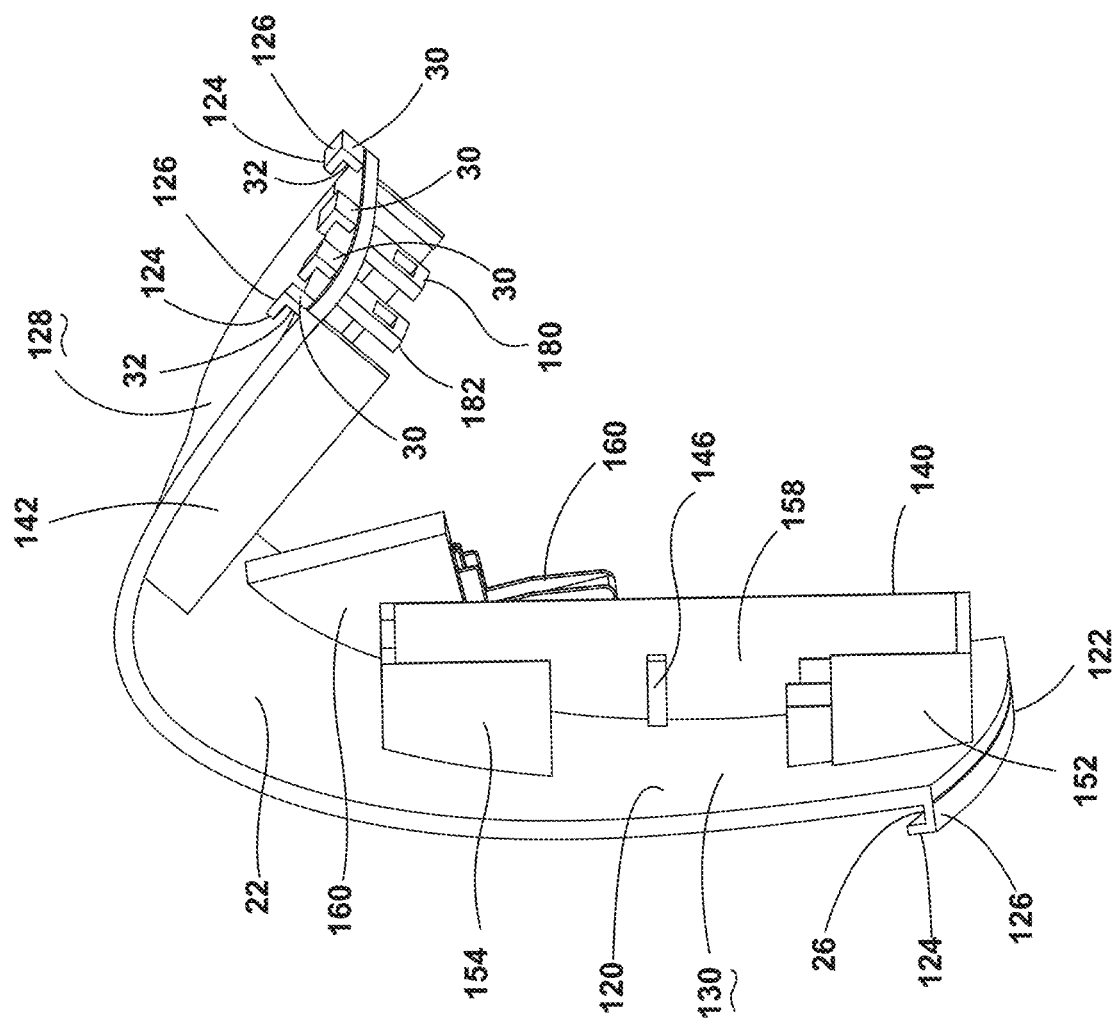
FIG. 9 is a side perspective view of a bracket of the present disclosure.

With reference to FIGS. 7-9, the display screen 34 is coupled to the bracket 22 via the elongated slot 26 defined by the bracket 22, such that the bracket 22 is disposed within the elongated slot 26. The bracket 22 includes a body 120 that includes the first edge 24 and the second edge 28, mentioned above. An elongated retention feature 122 outwardly extends from the first edge 24 of the bracket 22 to define the elongated slot 26, and the retention clips 30 outwardly extend from the second edge 28 of the body 120.

Stated differently, the slots 32 are defined by the plurality of retention clips 30, and the elongated slot 26 is defined by the elongated retention feature 122. Each of the plurality of retention clips 30 and the elongated retention feature 122 includes a retention flange 124 and a support base 126. The retention flanges 124 of each of the elongated retention feature 122 and the retention clips 30 extend from the first edge 24 and the second edge 28 of the bracket 22, respectively. The support bases 126 and the retention flanges 124, along with a first surface 128 of the bracket 22, define the elongated slot 26 of the elongated retention feature 122 and the slots 32 defined by each of the plurality of retention clips 30. A second surface 130 of the bracket 22 may be referred to as a component surface, such that the assembly circuit board 36 and the display circuit board 114 may each be disposed on the component surface 130.

With further reference to FIGS. 7-9, the body 120 of the bracket 22 includes a housing 140 that may include a first housing 140 and a second housing 142. The first and second housings 140, 142 are generally defined by a plurality of walls 144 and each includes support members 146, described below, disposed within the plurality of walls 144 of each of the first and second housings 140, 142. A first peripheral wall 148 and a second peripheral wall 150 of the first housing 140 each define locking apertures 152. The plurality of walls 144 of the first housing 140 further include a first sidewall 154, a second sidewall 156, and a third sidewall 158.

The first sidewall 154 may be positioned proximate to an attachment feature 160 and extends between the first and second peripheral walls 148, 150. The second sidewall 156 extends from the first peripheral wall 148, and the third sidewall 158 extends from the second peripheral wall 150 proximate to the second sidewall 156. A space 162 is defined between the first and second sidewalls 154, 156 through which the insulated tube 100 extends. The insulated tube 100 houses the electrical wiring 102 mentioned above, which is communicatively coupled to the assembly circuit board 36. The third sidewall 158 may enclose the first housing 140. Additionally or alternatively, the third sidewall 158 may also define the space 162 through which the insulated tube 100 may extend.

Figure 10:
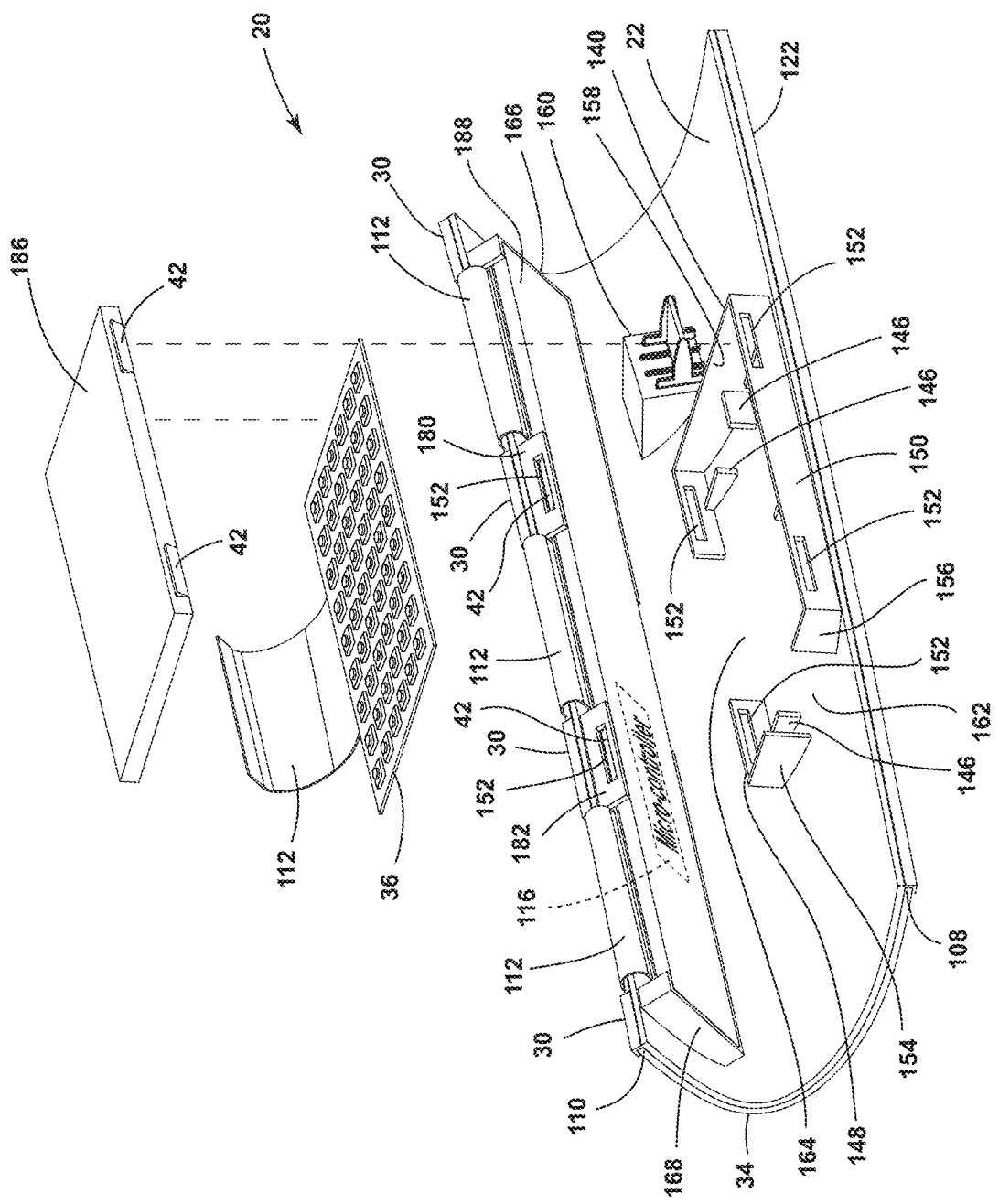
FIG. 10 is an exploded side perspective view of an assembly circuit board and a bracket of the present disclosure.
Figure 11:
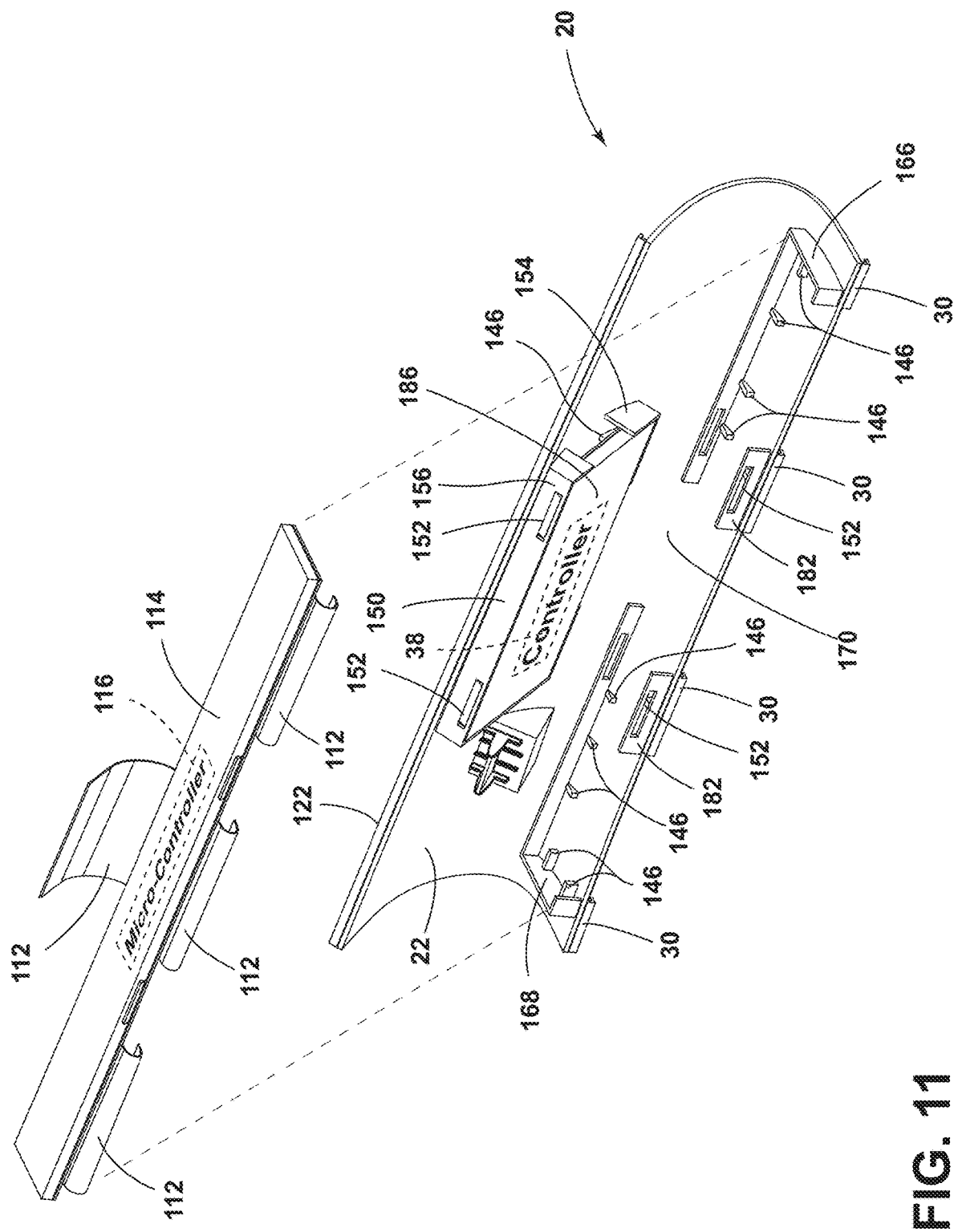
FIG. 11 is an exploded side perspective view of a display circuit board and a bracket of the present disclosure.
Figure 12:
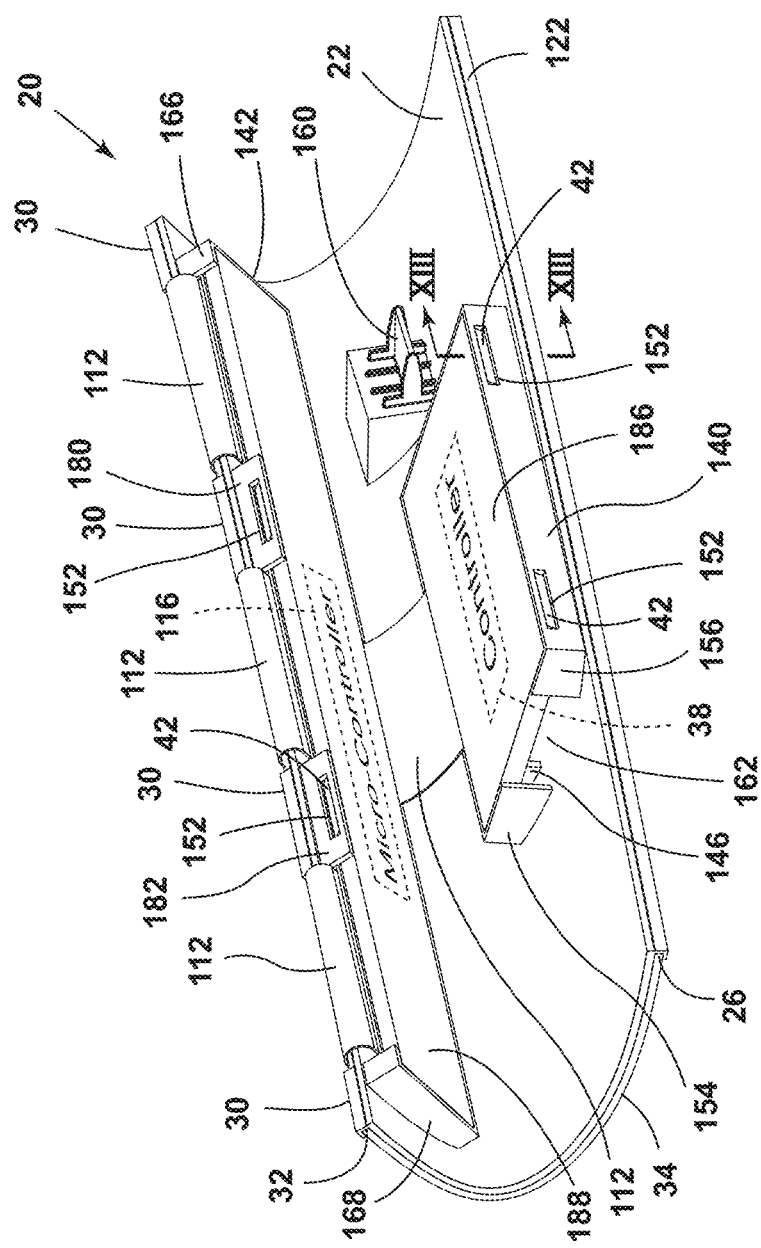
FIG. 12 is a side perspective view of a bracket of the present disclosure having a first housing and a second housing.

With reference to FIGS. 9-11, the first peripheral wall 148 of the first housing 140 may also define an opening 164, such that the opening 164 may be proximate to a first peripheral wall 166 and a second peripheral wall 168 of the second housing 142. The first and second peripheral walls 166, 168 of the second housing 142 similarly define a receiving opening 170 across from the opening 164 defined by the first peripheral wall 148 of the first housing 140. One of the electrical connectors 112 may extend from the assembly circuit board 36 through the opening 164 defined by the first peripheral wall 148 of the first housing 140 and through the receiving opening 170 defined by the first peripheral wall 166 of the second housing 142. Stated differently, the display circuit board 114 is coupled to the assembly circuit board 36 via the electrical connector 112 extending through the opening 164 and the receiving opening 170 defined by at least the first peripheral walls 148, 166 of the first and second housings 140, 142, respectively.

The second housing 142 includes a first tab 180 and a second tab 182 that each define the locking apertures 152, mentioned above. The first peripheral wall 166 and the second peripheral wall 168 also define the locking apertures 152. The first housing 140 is configured to receive the assembly circuit board 36, and the second housing 142 is configured to receive the display circuit board 114. The assembly circuit board 36 and the display circuit board 114 may be disposed on the support members 146 within the first and second housings 140, 142, respectively. The support members 146 may be rectangular, triangular, square, or any other shape generally known in the art. The support members 146 generally provide a pedestal on which the assembly and display circuit boards 36, 114 may be disposed, such that the assembly and display circuit boards 36, 114 are generally raised above the body 120 of the bracket 22.

The airflow within the bracket 22, specifically the first and second housings 140, 142 may be beneficial to the raised assembly and display circuit boards 36, 114. As mentioned above, the first and second housings 140, 142 define the opening 164 and the receiving opening 170 through which the electrical connectors 112 of the assembly circuit board 36 may pass. The second housing 142 also partially defines slits 184 through which the electrical connectors 112 of the display circuit board 114 may pass. It is generally contemplated that the support members 146 may also provide aided structural configuration for the extension of the electrical connectors 112 as each passes through the respective openings defined by the respective housings.

Referring to FIGS. 10-14 and as mentioned above, the cap 40 includes the locking features 42 and is selectively coupled to the bracket 22. The cap 40 may include a first cap 186 and a second cap 188, which may be coupled to the first housing 140 and the second housing 142 respectively. The locking features 42 of the first and second caps 186, 188 may selectively engage the locking apertures 152 defined by the first and second housings 140, 142 to define a snap-fit arrangement. It is generally contemplated that the first and second caps 186, 188 may each include four locking features 42; however, it is also contemplated that the first and second caps 186, 188 may include more than four locking features 42 or less than four locking features 42. The number of locking features 42 may depend on the number of locking apertures 152 defined by each of the first and second housings 140, 142 and the configuration of the bracket 22.

Figure 13:
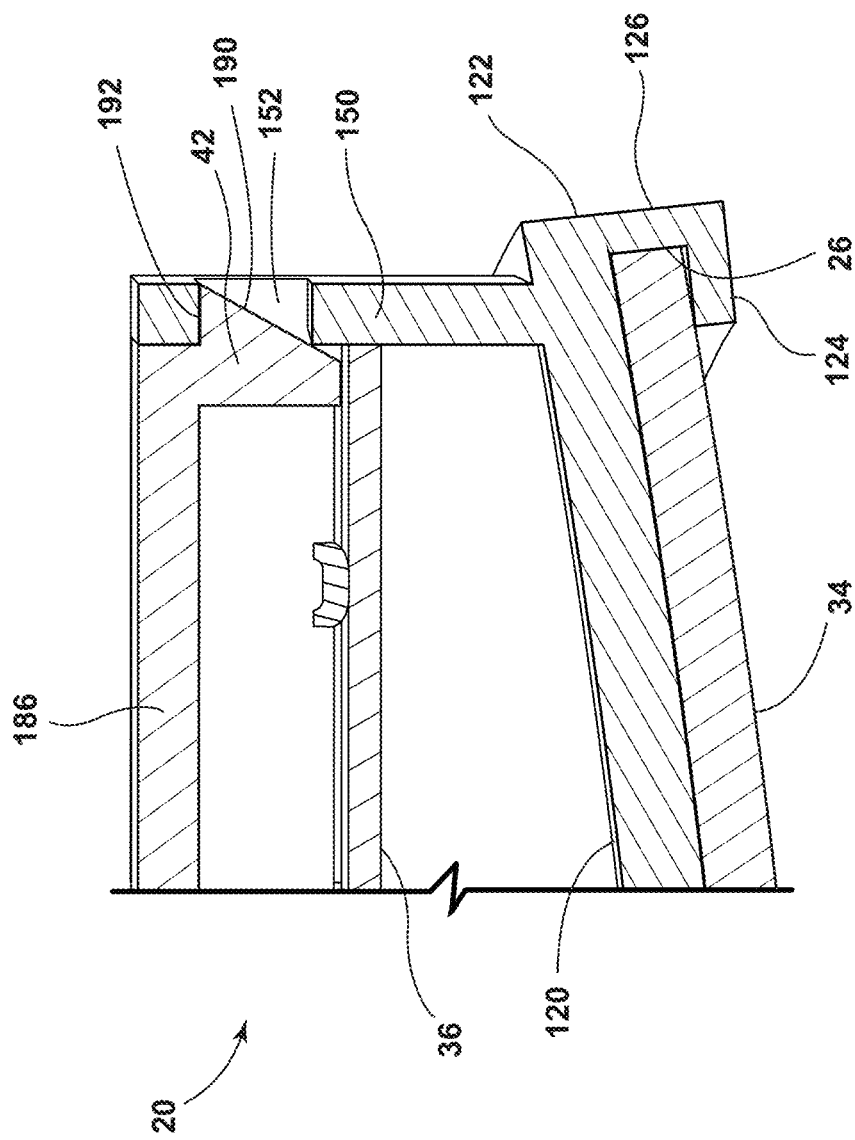
FIG. 13 is an enlarged cross-sectional view of a locking feature of the present disclosure taken at lines XIII-XIII of FIG. 12.
Figure 14:
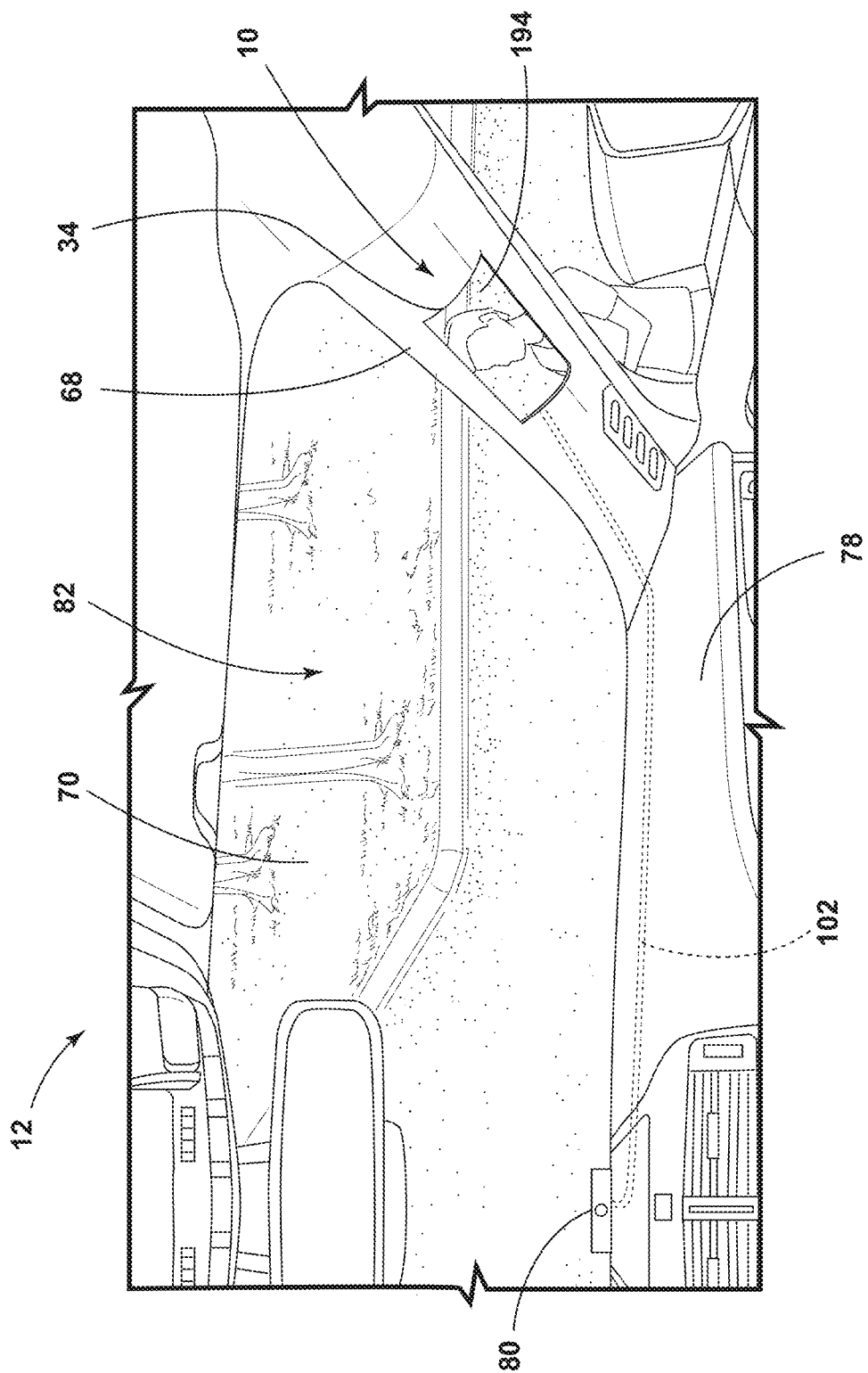
FIG. 14 is an enlarged partial side perspective view of a display assembly of the present disclosure within a pillar assembly of the present disclosure.

By way of example, not limitation, the locking features 42 are illustrated as having an angular portion 190 that generally extends away from the cap 40. The angular portion 190 terminates at an engagement base 192 that is disposed within the locking apertures 152. As illustrated in FIG. 13, the engagement base 192 engages the second peripheral wall 150 of the first housing 140 to couple the first cap 186 to the first housing 140. A similar engagement arrangement is used to couple the second cap 188 to the second housing 142. The first and second caps 186, 188 cover each of the assembly circuit board 36 and the display circuit board 114, which are respectively disposed within the first and second housings 140, 142. The second cap 188 and the first and second tabs 180, 182 define the slits 184 of the second housing 142 through which the electrical connectors 112 may pass to couple the display circuit board 114 to the display screen 34.

With further reference to FIGS. 10-14, the display screen 34 is operably coupled to the bracket 22 via the elongated retention feature 122 and the plurality of retention clips 30. As mentioned above, the first side 108 of the display screen 34 is disposed within the elongated slot 26 defined by the elongated retention feature 122, and the second side 110 of the display screen 34 is disposed within the slots 32 defined by the retention clips 30. The display screen 34 may be powered via the electrical connectors 112 from the display circuit board 114 and indirectly via the electrical wiring 102 communicatively coupled to the assembly circuit board 36. The electrical wiring 102 may include data cords from the camera 80, which are communicatively coupled to the assembly circuit board 36.

The assembly circuit board 36 receives data input from the data cords of the electrical wiring 102 from the camera 80. The controller 38 processes the data received from the camera 80 and translates the information from the assembly circuit board 36 to the display circuit board 114. The microcontroller 116 of the display circuit board 114 receives the data from the controller 38 of the assembly circuit board 36. The microcontroller 116 translates the data received into an image, which is then displayed on the display screen 34 of the display assembly 20. It is generally contemplated that the display assembly 20 is configured to display the area exterior 82 to the vehicle 12 that may be obstructed by the A-pillar 68. As mentioned above, the A-pillar 68 and the pillar assembly 10 are generally formed from solid, opaque materials, including the trim panel 16. The display assembly 20 is configured to display an image 194 of the area exterior 82 to the vehicle 12 that may otherwise be obstructed by the pillar assembly 10.

By way of example, and not limitation, the camera 80 may detect a person proximate to the vehicle 12 and generally disposed behind the pillar assembly 10. The camera 80 may capture data of the person proximate to the vehicle 12 and communicate the data via the electrical wirings 102 to the assembly circuit board 36. The controller 38 of the assembly circuit board 36 may electrically communicate the data received from the electrical wirings 102 to the microcontroller 116 of the display circuit board 114. The microcontroller 116 may then project the image 194 of the person on the display screen 34 of the display assembly 20, such that the occupant of the vehicle 12 may be generally free from obstructions via the pillar assembly 10 relative to the exterior of the vehicle 12. Stated differently, the user of the vehicle, whether in the passenger seat 64 (FIG. 2) or the driver seat 62 (FIG. 2), may be able to view the area exterior 82 of the vehicle 12 via the image 194 displayed by the display assembly 20 disposed on the A-pillar 68, such that the user is otherwise free from obstruction by the A-pillar 68.

Referring again to FIGS. 1-14, the display assembly 20 of the pillar assembly 10 provides the user with a general view of the exterior of the vehicle 12 that may otherwise be obstructed by the A-pillar 68. The bracket 22 provides structural support for the display screen 34 and the display circuit board 114, such that the display assembly 20 may be operably coupled to the pillar assembly 10 and the A-pillar 68. The first and second housings 140, 142 generally provide a space within the bracket 22 in which the electrical components of the display assembly 20 may be housed. The bracket 22, as mentioned above, also includes the elongated retention feature 122 that defines the elongated slot 26 and the retention clips 30 that define the slots 32.

The elongated retention feature 122 and the plurality of retention clips 30 are configured to retain the display screen 34 within the bracket 22 to properly align the display screen 34 within the trim panel 16. The overall configuration of the display assembly 20 securely retains the display screen 34 within the bracket 22 and within the aperture 18 defined by the trim panel 16. Stated differently, the electrical connectors 112 extending through the opening 164 and the slits 184 respectively defined by the first and second housings 140, 142 securely retains the display screen 34. In addition, the retention of the display screen 34 within the elongated slot 26 and the slots 32 respectively defined by the elongated retention feature 122 and the retention clips 30 further securely retains the display screen within the bracket 22 and within the aperture 18 defined by the trim panel 16. Stated differently, the bracket 22 generally provides compact and structural support for the display screen 34 and display circuit board 114.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A pillar assembly for a vehicle, comprising,
a pillar frame;
a trim panel disposed on and coupled to the pillar frame, the trim panel defining an aperture; and
a display assembly disposed within the aperture and operably coupled to the pillar frame, the display assembly comprising:
a bracket coupled to the pillar frame and having a first edge that defines an elongated slot and a second edge that includes retention clips, the retention clips each defining a slot;
a display screen operably coupled to the bracket and disposed within the aperture of the trim panel;
an assembly circuit board operably coupled to the bracket and communicatively coupled to the display screen, the assembly circuit board including a controller; and
a cap defining locking features and selectively coupled to the bracket.

2. The pillar assembly of claim 1, wherein the display screen has a first side and a second side, and wherein the first side is disposed within the elongated slot and the second side is disposed within the slots defined by each of the retention clips.

3. The pillar assembly of claim 1, wherein the bracket further includes a housing that includes a plurality of walls, and wherein the plurality of walls defines a first peripheral wall and a second peripheral wall that each define locking apertures.

4. The pillar assembly of claim 3, wherein the locking features of the cap are operably coupled to the housing of the bracket via the locking apertures.

5. The pillar assembly of claim 1, wherein the bracket further includes an attachment feature, and wherein the bracket is coupled to the pillar frame via the attachment feature.

6. The pillar assembly of claim 1, wherein the display assembly further includes a display circuit board communicatively coupled to the assembly circuit board and the display screen, and wherein the display screen is configured to display an image of an area exterior to said vehicle.

7. The pillar assembly of claim 6, wherein the display circuit board is operably coupled to the display screen and at least partially extends between the retention clips of the bracket.

8. A display assembly for a vehicle pillar, comprising:
a bracket having a first edge that defines an elongated slot and a second edge that includes retention clips, the bracket including a first housing and a second housing;
an assembly circuit board disposed within the first housing, the assembly circuit board including a controller;
a display screen operably coupled to the bracket;
a display circuit board electrically coupled to the display screen and communicatively coupled with the assembly circuit board, the display circuit board being disposed within the second housing; and
at least one cap selectively coupled to one of the first housing and the second housing, the at least one cap including locking features.

9. The display assembly of claim 8, wherein the bracket includes an elongated retention feature that defines the elongated slot.

10. The display assembly of claim 9, wherein the display screen has a first side and a second side, and wherein the first side is operably coupled to the elongated retention feature and the second side is operably coupled to each of the retention clips.

11. The display assembly of claim 8, wherein the first housing and the second housing each include peripheral walls that define locking apertures.

12. The display assembly of claim 11, wherein the at least one cap includes a first cap and a second cap, and wherein the locking features of the first cap are disposed within the locking apertures of the first housing and the locking features of the second cap are disposed within the locking apertures of the second housing.

13. The display assembly of claim 8, further comprising:
an attachment feature coupled to the bracket, the attachment feature configured to couple the bracket to said vehicle pillar.

14. The display assembly of claim 8, wherein the display circuit board includes electrical connectors outwardly extending from the display circuit board, and wherein the electrical connectors extend between each of the retention clips of the bracket.

15. A bracket for a display assembly, comprising:
a body having a first edge and a second edge that define a first surface and a second surface of the body;
an elongated retention feature coupled to the first edge of the body and defining an elongated slot proximate to the first surface of the body;
a plurality of retention clips coupled to the second edge of the body, each of the plurality of retention clips defining a slot proximate to the first surface of the body;
at least one housing coupled to the second surface of the body and defining locking apertures; and
at least one cap selectively coupled to the at least one housing, the at least one cap defining locking features selectively disposed within the locking apertures defined by the at least one housing.

16. The bracket of claim 15, wherein the at least one housing includes a first housing and a second housing, and wherein the at least one cap includes a first cap operably coupled to the first housing and a second cap operably coupled to the second housing.

17. The bracket of claim 16, wherein the second housing includes a first tab and a second tab that at least partially define the second housing, and wherein the locking apertures of the second housing are defined by the first and second tabs and peripheral walls of the second housing.

18. The bracket of claim 15, wherein the elongated retention feature and the plurality of retention clips are configured to retain an arcuate display screen of said display assembly.

19. The bracket of claim 15, further comprising:
an attachment feature coupled to the second surface of the body.

20. The bracket of claim 15, further comprising:
an assembly circuit board disposed within the at least one housing.

* * * * *